R. W. PRATT.
DRIVING DEVICE FOR AUTOMOBILES, RAILWAY MOTOR CARS, AND LOCOMOTIVES.
APPLICATION FILED FEB. 25, 1922.
1,421,025.
Patented June 27, 1922.
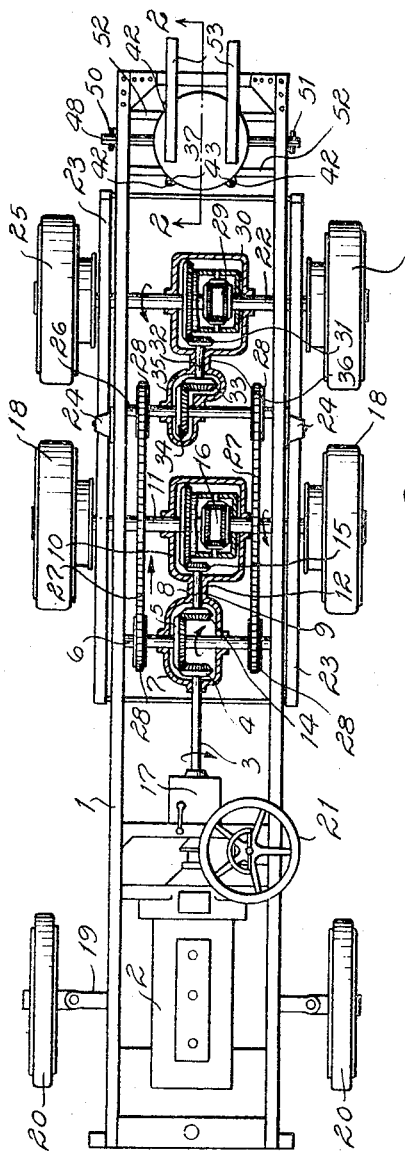
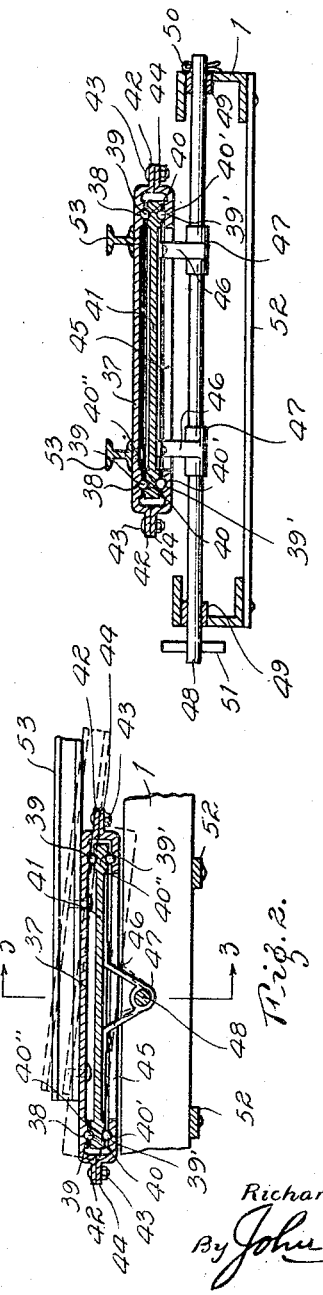
Inventor:
Richard W. Pratt.
By John C. Higdon
Attorney.

UNITED STATES PATENT OFFICE.

RICHARD W. PRATT, OF ST. LOUIS, MISSOURI.

DRIVING DEVICE FOR AUTOMOBILES, RAILWAY MOTOR CARS, AND LOCOMOTIVES.

1,421,025. Specification of Letters Patent. Patented June 27, 1922.

Application filed February 25, 1922. Serial No. 539,094.

*To all whom it may concern:*

Be it known that I, RICHARD W. PRATT, a citizen of the United States, residing at St. Louis, in the State of Missouri, have invented certain new and useful Improvements in Driving Devices for Automobiles, Railway Motor Cars, and Locomotives, of which the following is a specification containing a full, clear, and exact description, reference being had to the accompanying drawing, forming a part hereof.

My invention consists in the novel disclosure hereinafter particularly described and claimed.

The object of my invention is to provide an improved driving, supporting and traction mechanism for motor vehicles; which will distribute the load on four drive-wheels instead of two, and thereby reduce the weight of the load on two drive-wheels; that will carry more load than the present four-wheel truck and trailer; that will ride easier, as a passenger-car, than does the present four-wheel car; that will be practically non-skidding; that will go through deeper mud and sand than the present four-wheel car; that will save in tires and other equipment, due to lessened weight on each drive-wheel, and to lessened vibration and friction; that will increase the tractive effort, and enable a greater load to be pulled by my four-wheel drive and trailer, than can be pulled by the present two-wheel drive and a trailer; and that when used as a four-wheel drive and trailer with four supporting-wheels in the rear and two supporting-wheels in front, it will have a total of ten wheels, and will carry a large number of passengers when equipped as a passenger-bus; thus assisting very materially and efficiently in solving the congested traffic conditions on the present crowded streets, and car lines.

In the drawings,

Fig. 1 is top plan-view, partly in section, of an automobile chassis constructed in accordance with my invention.

Fig. 2 is a detail vertical section of the trailer turn-table connection, detachably located on the rear portion of the automobile chassis or frame, the section being taken on the line 2—2 of Fig. 1, and Fig. 3 is an enlarged detail transverse section of the turn-table trailer-connection, the section being taken on line 3—3 of Fig. 2.

In carrying out my invention, I provide an extra long chassis or frame 1, in the forward portion of which is mounted the motor or engine 2, which is of ordinary construction, and is provided with the usual control devices, and means for supplying fuel.

Extending from the motor or engine 2 is the customary drive-shaft 3, which has fixed on its rear end a bevel-gear or pinion 4, that meshes with and drives a larger bevel-gear 5 fixed on a transverse sprocket-wheel shaft 6.

Said shaft 6 is mounted in suitable bearings of said chassis frame 1, and also extends through a common housing 7, which encloses and protects the bevel-gears therein contained.

Said shaft 6 also has bearings in the opposite side-walls of the said housing 7.

A short shaft 8 has its front portion mounted in a bearing 9 in the rear wall of said housing 7, while the rear portion of said short shaft is mounted in a bearing in the front wall of a front differential-housing 10, that is carried by the forward driving-axle 11 of the machine.

Said two adjacent housings 7 and 10 may be connected, as shown in Fig. 1, by a short tubular neck 12, and the bodies of both housings may be cast integral.

On the front end of said short shaft 8 is fixed a bevel-gear or pinion 14, which meshes with the teeth of the said large bevel-gear 5 carried by the said front sprocket-wheel shaft 6, and on the rear end of said short shaft is fixed a differential driving-pinion 15.

A well-known form of differential-gear 16 is mounted on the driving-members of the said forward driving-axle 11, within said front differential-housing 10.

Said pinion 15 has its teeth in mesh with those of the usual driving bevel-gear of the said differential-gear 16, so that motion is communicated to the latter whenever said short shaft 8 is revolved in either direction by the power of the motor through the usual change-speed and reversing-gears which may be located in the usual housing or gear-box 17, in case the motor is of the internal-combustion type.

If a steam-engine is used, no such gear will be needed, so far as I am at present informed.

Forward traction-wheels (or drive-wheels) 18 are mounted on the outer ends of the said front driving-axle 11, which, in the present illustration of my invention, is located at about the center of the length of the said chassis or main frame 1, so as to form supporting and traction wheels at a point about midway between the usual steering-axle 19 and a rear set of supporting and traction wheels, which will be presently described more in detail.

Said steering-axle 19 is provided with the usual combined supporting and steering wheels 20, which are controlled by a driver's steering-wheel 21 in any well-known manner.

Said forward driving-axle 11, as well as a rear driving-axle 22, is mounted in (or upon) a separate under-frame 23, which is rectangular in form, and is connected at about the center of its length with the main frame 1, by means of suitable brackets or bearings 24, and the forward and rear portions of said under-frame are provided with cross-bars which extend beneath said main frame, and assist in supporting the latter.

A rear sprocket-wheel shaft (or jackshaft) 26, is mounted in suitable bearings on said main frame 1, in a manner about like that of the previously-described front sprocket-wheel shaft 6, at some distance in the rear of the said front differential-housing 10, transversely of said frame.

One or more sprocket-chains 27, running upon sprocket-wheels 28 fixed on said sprocket-wheel shafts, communicate the necessary power from said front sprocket-wheel shaft 6 to the said rear sprocket-wheel shaft 26.

A rear differential-gear 29, similar to said front differential-gear 16, is mounted on the driving-members of the said rear driving-axle 22, in a housing 30.

Said rear driving-axle 22 is driven by a pinion 31 that is fixed upon the adjacent rear end of a short shaft 32, which has a bevel-gear or pinion 33 fixed on its front end; said pinion 31 meshing with the teeth of the well-known driving bevel-gear of said rear differential-gear 29; and said pinion 33 meshing with the teeth of a bevel-gear 34 that is fixed upon the said rear sprocket-wheel shaft 26, within a gear-housing 35 carried by said shaft 26.

Said short shaft 32 is mounted in suitable bearings in the adjacent walls of said gear-housing 35 and the housing 30 of the said rear differential-gear 29; said housings being connected by a tubular-neck 36. preferably, through which said short shaft extends, and by means of which it is protected from dirt, rain, snow, and mud.

*The turn-table trailer-connection.*

A turn-table top-member 37 has a circular ball-race 38 in its underside, and is mounted to rotate upon balls or their equivalents 39, which engage the said ball-race, and also roll in an opposite ball-race 40 formed in the upper surface of the non-rotatable base 41 of the turn-table. Fig. 3.

To detachably retain said top-member 37 in position, it is provided with marginal perforated ears 42, through the perforations of which are passed clamping-bolts or screws 43, which are also passed through the perforations of mating perforated-ears 44 on the marginal-edge of a retaining-ring 45.

Said retaining-ring 45 is located beneath said base-plate 41 of the turn-table, and is provided with a ball-race 40' in its upper face, in which balls 39' roll, and also engage a mating ball-race 40'' formed in the under side of the said base-plate 41.

By such construction, the said top-member 37 of the turn-table will turn with but little friction upon the said supporting anti-friction devices (or balls 39), no matter how heavy the load imposed upon said top-member; and yet it cannot be accidentally detached from its position, as it is held firmly in place, by the said retaining-ring 45.

The said base-plate 41 is supported upon brackets 46, which are riveted or otherwise secured to the under-side of said base-plate, and said brackets have tubular portions 47 which are mounted upon a detachable turn-table cross-bar 48.

Said cross-bar 48 is detachably-mounted in bearings or apertures 49 formed in the opposite side-sills or members of the said main frame 1 of the machine, at a point adjacent the rear end of said main frame, so that when it is desired to remove the turn-table trailer-connection from the machine, it will only be necessary to pull out the cotter-pin 50 from its seat in the projecting end of said cross-bar, and grasp the handle 51 at the opposite end of said cross-bar, and pull the latter out of said tubular-portion 47 of the said brackets 46, as well as out of the bearing in said main frame 1; whereupon the said entire turn-table can be removed and stored until it is desired to again make use of a trailer.

A pair of cross-bars 52, extend across the underside of the said main frame 1, beneath the said turn-table, and these may be availed of to temporarily support the turn-table after the said turn-table cross-bar 48 has been withdrawn.

The numeral 53 designates suitable trailer frame-bars, which rest upon the said turn-table top-member 37, and may be secured in position thereon in any desired manner, by bolts or other well-known means.

The trailer may be of the two-wheel, or four-wheel type, as desired.

My turn-table trailer-connection, as above described, is not only capable of rotating, but it is a tipping or rocking turn-table, which tilts or rocks upon the said turn-table cross-bar 48, when the machine and attached trailer go up and down hills, or over rough roads, as indicated by the dotted lines in Fig. 2, to prevent binding or breakage of the parts, which might occur if the trailer were rigidly attached to the traction-exerting truck or locomotive.

*The operation.*

The operation of my invention will be readily apparent from the above description, as will also the advantages thereof, and the same need not be further elucidated.

I do not limit myself to the exact form and construction of the various parts of my invention, as the same may be changed by skilled mechanics without departing from the spirit of my invention.

I claim:—

A driving mechanism, composed of a main frame; a motor mounted at the forward portion of said main frame and having a driving-shaft extending a distance rearwardly; a forward sprocket-wheel shaft having a bevel-gear and a sprocket-wheel fixed thereon; a pinion on the rear end of said driving-shaft meshing with the teeth of said bevel-gear carried by said forward sprocket-wheel shaft; a rear sprocket-wheel shaft also having a bevel-gear and a sprocket-wheel fixed thereon; a sprocket-chain connecting the said sprocket-wheel of said front sprocket-wheel shaft with the said sprocket-wheel that is carried by said rear sprocket-wheel shaft; an under-frame located beneath said main frame; brackets which connect said under-frame to the said main frame; forward and rear driving-axles carried by the said under-frame; four traction-wheels mounted on the said driving-axles; a differential-gear on said forward driving-axle; a differential gear on said rear driving-axle; driving-means connecting said bevel-gear of said forward sprocket-wheel shaft to the differential-gear of said forward driving-axle, to drive the latter; driving-means connecting the bevel-gear of the said rear sprocket-wheel shaft to the differential-gear of the said rear driving axle, to drive the latter; and suitable housings for said two differentials and said bevel-gears and driving-means; whereby a four-wheel drive will be provided for the said main frame of the automobile, truck, railway motor-car, bus, or locomotive.

In testimony whereof, I have signed my name to this specification in presence of two subscribing witnesses.

RICHARD W. PRATT.

Witnesses:
JOHN C. HIGDON,
HENRY L. HIGDON.